Patented Mar. 8, 1949

2,463,608

UNITED STATES PATENT OFFICE 2,463,608

PROCESS FOR PURIFYING ACRYLIC ESTERS

Martin L. Fein, Riverside, N. J., and Charles H. Fisher, Abington, Pa., assignors to United States of America as represented by the Secretary of Agriculture No Drawing. Original application December 10, 1943, Serial No. 513,741. Divided and this application September 21, 1945, Serial No. 617,912

5 Claims. (Cl. 260—486)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This application is a division of copending application for patent, Serial No. 513,741, filed December 10, 1943, now Patent No. 2,414,589, dated January 21, 1947.

This invention relates to an improved process for purifying acrylic esters.

In the preparation of acrylic esters, the product obtained often contains impurities which give it an off color, usually amber or yellow. For example, when methyl acrylate is prepared by the pyrolysis of methyl alpha-acetoxypropionate, the pyrolysis product has an amber color, although the pure product is known to be colorless. Careful distillation in recovering the methyl acrylate does not avoid this off color and it persists even after redistillation of the methyl acrylate fraction. The presence of color in the ester is objectionable because polymerized products formed from the ester will as a result also be colored, which is frequently undesirable.

We have found that acrylic esters having an off color can be purified by treatment with certain alkaline reagents, with bisulfite solutions, or with the dust of certain metals, notably zinc.

Thus, we have found that colorless acrylic esters can be obtained by washing the colored esters with aqueous solutions of metal hydroxides. Sodium hydroxide is characteristically used, but similar results can be obtained with other metal hydroxides, such as lithium, magnesium, potassium, calcium, and cesium hydroxide. Equally good results are obtained with aqueous bisulfite solutions. The water remaining in the ester after the washing operation may be removed by distillation, unless a water-ester azeotrope is formed, in which case an entraining agent may be used or the water may be removed by adding drying agents, such as anhydrous calcium sulfate.

The use of metal dust to decolorize acrylic esters is particularly advantageous, because it allows the purification to be effected during the process of recovering the esters. Thus, a colorless acrylic ester distillate can be obtained by adding the metal dust to the crude pyrolysis product prior to distillation. Acrylic esters are also decolorized by heating in the presence of a metal dust. Zinc dust is preferably used, but the dust of any metal above hydrogen in the electromotive series may also be used.

Our invention is illustrated by the following examples:

Example I

Methyl acrylate was prepared by pyrolyzing methyl alpha-acetoxypropionate by a previously described method (Smith and coworkers, Ind. Eng. Chem. 34, 473–9 (1942)). Distillation of the pyrolysis products gave a methyl acrylate fraction with an amber or yellow color. This color was not removed by subsequent redistillation of the methyl acrylate fraction.

The color was readily removed, however, by one washing with 20 percent sodium hydroxide (the amount of sodium hydroxide used was 5 percent by volume of the methyl acrylate fraction) at room temperature. Polymerization by known methods of colorless methyl acrylate obtained as described above yielded colorless polymers.

Example II

Another sample (70 cc.) of the colored methyl acrylate was treated with 4 cc. of aqueous saturated sodium bisulfite solution. After being shaken for a few minutes, the upper layer of methyl acrylate became colorless.

Example III

A sample (65 cc. of amber liquid comprising essentially a mixture of methyl acrylate, acetic acid and unchanged methyl alpha-acetoxypropionate) obtained by pyrolyzing methyl alpha-acetoxypropionate was placed in a flask with 1 gram of zinc powder and distilled. Unlike the original pyrolysis mixture, the distillate obtained at a vapor temperature of about 80° C. (methyl acrylate) was colorless. The amber color had disappeared also from the material remaining in the distillation flask. Hydroquinone or other inhibitors may be used to prevent premature polymerization.

Having thus described our invention, we claim:

1. The process of removing the colored substances from colored alkyl ester of acrylic acid obtained as a distillate fraction from the pyrolysis of alkyl alpha-acetoxy propionate, consisting of washing the said colored alkyl acrylic acid ester fraction with a reagent consisting of an aqueous solution of an hydroxide taken from the group consisting of alkali metal and alkaline earth metal hydroxides, thereby leaving colorless alkyl acrylate.

2. The process of claim 1 in which the solution is aqueous sodium hydroxide.

3. The process of claim 1 in which the solution is aqueous sodium hydroxide at room temperature.

4. The process of claim 1 in which the solution is 20% aqueous sodium hydroxide at room temperature and the alkyl acrylate is methyl acrylate.

5. The process of claim 1 in which the alkyl acrylate is methyl acrylate.

MARTIN L. FEIN.
CHARLES H. FISHER.

REFERENCES CITED

The following references are of record in the file of this patent:

UNITED STATES PATENTS

| Number | Name | Date |
| --- | --- | --- |
| 1,401,937 | Bailey | Dec. 27, 1921 |
| 1,993,089 | Crawford | Mar. 5, 1935 |
| 2,020,685 | Izard | Nov. 12, 1935 |
| 2,266,004 | Coes | Dec. 16, 1941 |
| 2,314,443 | Crawford et al. | Mar. 23, 1943 |
| 2,394,572 | Utermohlen | Feb. 12, 1946 |
| 2,404,267 | Barnes | July 16, 1946 |